(12) United States Patent
Fitter

(10) Patent No.: US 6,446,681 B1
(45) Date of Patent: Sep. 10, 2002

(54) FILLER UNIT FOR TOPPING UP A CONTAINER WITH LIQUID

(76) Inventor: Johan Christiaan Fitter, 51 Mount Street, Bryanston (ZA)

( * ) Notice: Subject to any disclaimer, the term of this patent is extended or adjusted under 35 U.S.C. 154(b) by 0 days.

(21) Appl. No.: 09/644,945

(22) Filed: Aug. 23, 2000

(30) Foreign Application Priority Data

Aug. 24, 1999 (ZA) ............................................... 99/5410

(51) Int. Cl.$^7$ .......................... B65B 31/00; E03B 11/00
(52) U.S. Cl. ......................... 141/46; 141/324; 137/260; 137/261
(58) Field of Search ........................... 141/46, 324, 198, 141/115, 86; 137/260, 261, 14; 429/64

(56) References Cited

U.S. PATENT DOCUMENTS

| | | | |
|---|---|---|---|
| 1,791,152 A | * 2/1931 | Van Meter, Jr. | |
| 1,878,223 A | * 9/1932 | Woodbridge | |
| 2,139,477 A | * 12/1938 | Townsend | |
| 2,565,010 A | * 8/1951 | Warner | |
| 4,251,012 A | * 2/1981 | Owens et al. | |
| 4,544,004 A | * 10/1985 | Fitter et al. | 141/198 |
| 4,554,004 A | 11/1985 | Bierman et al. | |
| 4,754,777 A | * 7/1988 | Frode | 137/261 |
| 5,832,946 A | * 11/1998 | Campau | 137/260 |
| 6,164,309 A | * 12/2000 | Brecht | |

FOREIGN PATENT DOCUMENTS

WO     WO98/40653 A1    9/1998

OTHER PUBLICATIONS

Watermaster Network Watering System; Watermaster of America, Inc. 1994; Product Bulletin No. 7; pp. 1–12.

* cited by examiner

*Primary Examiner*—Charles R. Eloshway
*Assistant Examiner*—Khoa D. Huynh
(74) *Attorney, Agent, or Firm*—Alston & Bird LLP

(57) ABSTRACT

A battery watering unit is mounted atop a battery cell, and includes an open-topped vessel having a bottom wall. A side wall arrangement having an opening at the bottom forms a first divider to partition the vessel into a vented portion and an air entrapping portion. A further side wall arrangement having an opening at the top forms a second divider weir and imposes a significant restriction on the flow of electrolyte from the chamber into a pressure-communicating duct within a downpipe via a restricted orifice. The battery cell is topped up via the vessel with electrolyte following a flow-path over the second divider weir and into the downpipe. As the level of electrolyte rises, the lowermost opening in the downpipe is blocked. A further increase in the level of electrolyte forms, via the air-entrapping portion of the vessel, a pressurized air column in the downpipe which is sufficient to prevent further inflow of electrolyte over the second divider weir. In order to prevent overtopping of the battery cell, an aperture is fanned in a side or base wall of the vessel below the level of the first divider. This allows the venting of the pressurized air column between topping up operations so that the pressurized air column can re-establish itself on topping up of the vessel, thereby preventing over-topping of the battery cell.

13 Claims, 5 Drawing Sheets

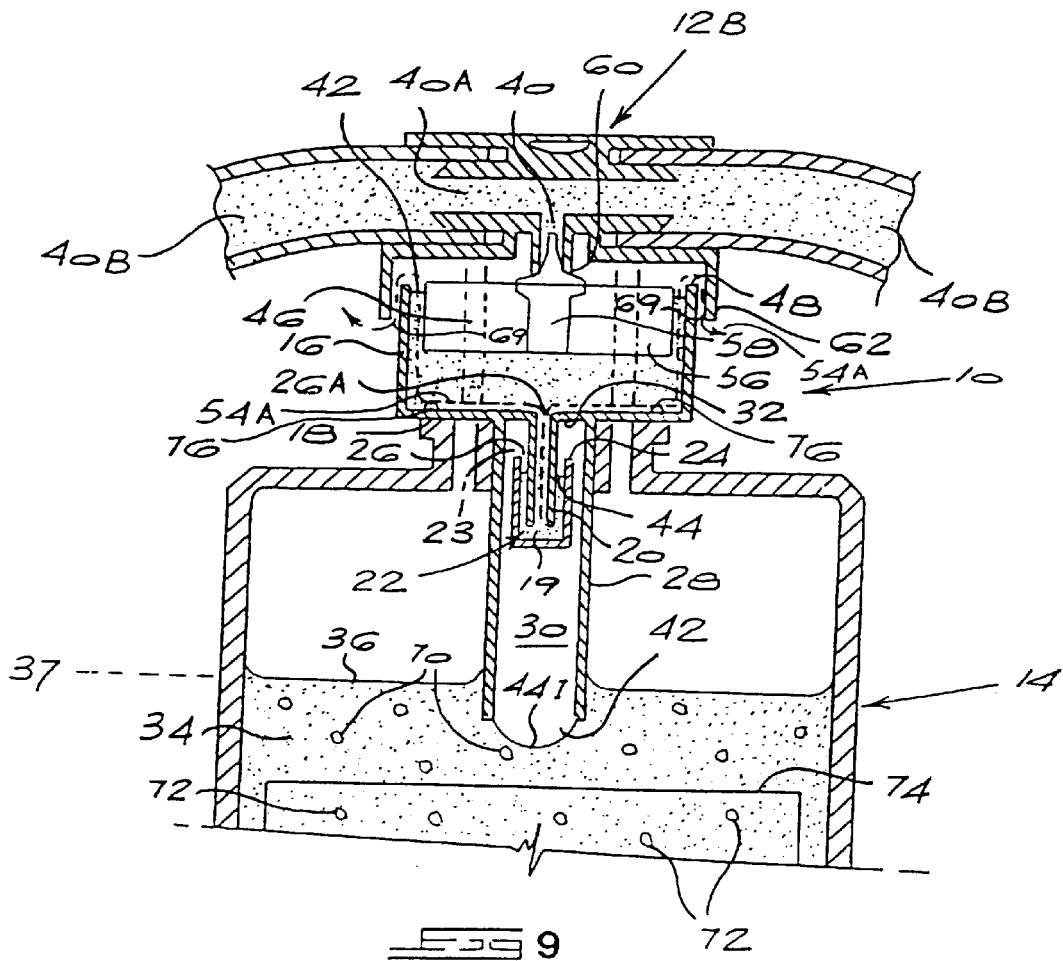

FILLER UNIT FOR TOPPING UP A CONTAINER WITH LIQUID

BACKGROUND OF THE INVENTION

This invention relates to a filler unit for adding replenishment liquid to a container to a predetermined, desired level. In one application, the unit is suitable for use in adding replenishment water to the electrolyte contained in a secondary battery.

Secondary battery cells have, traditionally, been provided with replenishment water to make up for water lost from the electrolyte due to evaporation and electrolysis. The process of adding water is simple when the number of battery cells is small and the batteries are readily accessible. For example, in the case of automobile batteries, battery cells Can be inspected and filled manually.

With larger batteries, the number of battery cells is often so large and the accessibility so poor that the task of replenishing by hand can become particularly difficult and time consuming.

Various filling systems have been developed which provide requisite water to all the battery cells via a single supply line. These have proved either insufficiently robust or prone to a variety of technical deficiencies which have been known to result occasionally in battery cells being overfilled, and in some cases not being filled at all.

In some filler units there are level sensors including floats that are in direct contact with the electrolyte, the floats being connected to valves. When the electrolyte level rises sufficiently the valves close and stop the flow of water. A variety of aggressive substances are released by the battery elements in normal operation which have a deleterious effect on contact with the floats, resulting in the floats remaining fixed in position, and therefore not able to control the flow of water into the battery cells.

Other designs, mindful of this disadvantage, utilize the water supply pressure itself as a shut-off mechanism. The flow rete is necessarily fast in order to set up the required degree of suction inside a specially shaped control duct. When the electrolyte level rises to cover the lower end of this duct, a resulting air pressure change inside the control duct triggers an internal protected control mechanism shut. Partial exhaustion of the water supply pressure results in the control mechanism not receiving an adequate trigger signal when the required level is reached, and thus the flow of water into the affected battery cells will not be stopped.

In yet another type of filter an air pressure sensing tube reaches into the battery cell. As the electrolyte level rises against the open bottom end of this tube, the tube becomes sealed, and the air pressure inside the tube rises, thereby providing a back pressure against inflowing water entering the battery cell from a special vessel housed above the cell. The water level inside this vessel is controlled, and when a condition of pressure equilibrium is reached along the flow path of the water from the vessel into the battery cell the flow of water into the cell is stopped. Such a filler is disclosed in International published patent application WO98/40653.

Some air pressure sensing filler devices rely on control of the water level in the vessel by means of a feed and overflow arrangement whereby the inflow is greater into the vessel than the inflow into the cell, and consequently there is an excess which flows out of the overflow. Others rely on a float and shut-off valve housed within the vessel, whereby the position of the float and consequently the degree of opening of the valve provides an inflow into the vessel which exactly matches the inflow into the cell.

An advantage of air pressure sensing filler devices is their simplicity. There are no sensitive parts in contact with the surface of the electrolyte.

Furthermore, they are not affected by supply underpressure, while a feature can be included which can protect against supply overpressure.

Since it is the inflowing replenishment water which provides the air seal at the head of the air pressure level sensing tube, the seal is preferably formed before the electrolyte level has closed off the bottom opening of the level sensing tube Consequently in some types of air pressure sensing filter devices, such as that disclosed in WO98/40653, if the seal is formed with the bottom opening of the tube already closed by the electrolyte, additional water can flow into the cell, causing the electrolyte level to be raised to a higher level than the desired level.

SUMMARY OF THE INVENTION

According to the first aspect of the invention there is provided a filter unit for dispensing a liquid into a container to top up the container to a predetermined desired level, the unit including a vessel for containing the liquid to be dispensed, means for establishing a first predetermined substantially constant head of liquid in the vessel, means defining at least one flow passage communicating between the vessel and the container, the flow passage defining means including a downpipe extending downwardly into the container, means for establishing a second head of liquid within the container responsive to the first head, the first and second head establishing means being arranged to co-operate to form there-between a pressurized air column in the downpipe, which is sufficient to prevent the inflow of water from the vessel to the container in response to filling of the vessel whilst the pre-existing level of liquid in the container is equal to or higher than the desired level, and evacuating means for reducing the level of the first head of liquid to a venting level at which the pressurized air column is vented to allow the pressurized air column to re-establish itself an topping up of the vessel, so as to prevent overtopping of the container.

In a preferred form of the invention, the means for establishing the first predetermined head of liquid includes divider means for dividing the vessel into a first vented portion in Which the liquid is permitted to reach a predetermined maximum head-defining level and a second air entrapping portion arranged to entrap the pressurized air column.

Preferably the evacuating means is arranged to evacuate the vessel prior to a subsequent topping up operation to the venting level at which the pressurized air column is depressurized by venting it to atmosphere via the, first vented portion.

Conveniently, the evacuating means is arranged to allow the level of liquid in the vented portion of the vessel to fall below the level of the divider means between topping up operations so that the second air entrapping portion is vented to atmosphere and the pressurized air column is depressurized.

In one form of the invention, the evacuating means comprises at least one aperture defined in a side or base wall of the vessel below the level of the divider means.

In an alternative form of the invention, the evacuating means comprises at least one opening via which the vessel vents to atmosphere, so as to allow evaporation of the liquid in the vessel between topping up operations Advantageously, the predetermined head-defining level is defined by an overflow rim or weir which is arranged to permit the overflow to follow a flowpath outside the container.

The means for establishing the second predetermined head of liquid preferably includes the downpipe terminating in a mouth portion which extends to a predetermined level a predetermined distance below the desired level, the distance being sufficient to establish the second head of liquid.

The entrapping portion is typically defined by the divider means and includes a first divider which extends downwardly to a first predetermined level within the vessel, and a second divider weir which extends upwardly to a second predetermined level above the first level and which divides the vessel from the downpipe, the difference in height between the first and second levels being sufficient to allow the second head to act and to entrap the pressurized column of air.

Conveniently, a restricted orifice is located at the head of the downpipe downstream of the entrapping portion, the restricted orifice being arranged to supplement the action of the first and second liquid head establishing means in defining an upper boundary of the pressurized air column at which a condition of pressure equilibrium is attained to cause the flow from the vessel to the container to cease automatically.

Advantageously, the means for establishing the first head of liquid in the vessel includes a float chamber having an uppermost inlet conduit and carrying a float valve arranged to shut off the inlet conduit in the event of the liquid in the float chamber reaching a predetermined level.

The filler unit is typically a battery watering unit, in which the container is a battery cell, and in which the downpipe is arranged to extend through a replenishment aperture in the cell, so that the watering unit is mounted atop the cell.

The invention extends to a battery watering unit for dispensing electrolyte into a battery cell to top up the cell to a predetermined desired level, the unit including a vessel for containing the electrolyte to be dispensed, means for establishing a first predetermined substantially constant head of electrolyte, means defining at least one flow passage communicating between the vessel and the cell, the flow passage defining means including a downpipe extending downwardly into a replenishment aperture in the cell, means for establishing a second head of electrolyte within the cell responsive to the first head, the first and second head establishing means being arranged to co-operate to form therebetween a pressurized air column in the downpipe which is sufficient to prevent the inflow of electrolyte from the vessel to the cell in response to filling of the vessel whilst the preexisting level of electrolyte in the cell is equal to or higher than the desired level, and evacuating means for reducing the level of the first head of electrolyte to a venting level at which the pressurized air column is vented to allow the pressurized air column to re-establish itself on topping up of the vessel, so as to prevent overtopping of the battery cell.

BRIEF DESCRIPTION OF THE DRAWINGS

The invention is hereinafter described with reference to the accompanying drawings wherein identical reference numerals denote similar elements or elements possessing direct equivalent functioning:

FIG. 9 shows a cross-sectional view of a third embodiment of a filler unit of the invention in use in which the quantity of liquid in the container is equal to, or higher than the desired level

DESCRIPTION OF EMBODIMENTS

The principle of operation of a filler unit according to the invention will be described with reference to FIGS. 1 to 3, 4 to 8 and 9 of the drawings which show, respectively, first. second and third embodiments of the invention in use on a container.

The first embodiment is shown in use in an operation in which the quantity at liquid in the container is equal to, or higher than the desired level; the second embodiment is shown in use in an operation in which the quantity of liquid in the container is below the desired level, and the third embodiment is shown in use on a container holding a quantity of liquid with gas bubbles.

It should be appreciated that any of the embodiments may be placed in operation on a container holding a quantity of liquid above, equal to or below the desired level. The first and second embodiments may also be placed in operation on a container holding a quantity of liquid with gas bubbles.

Figure 1:
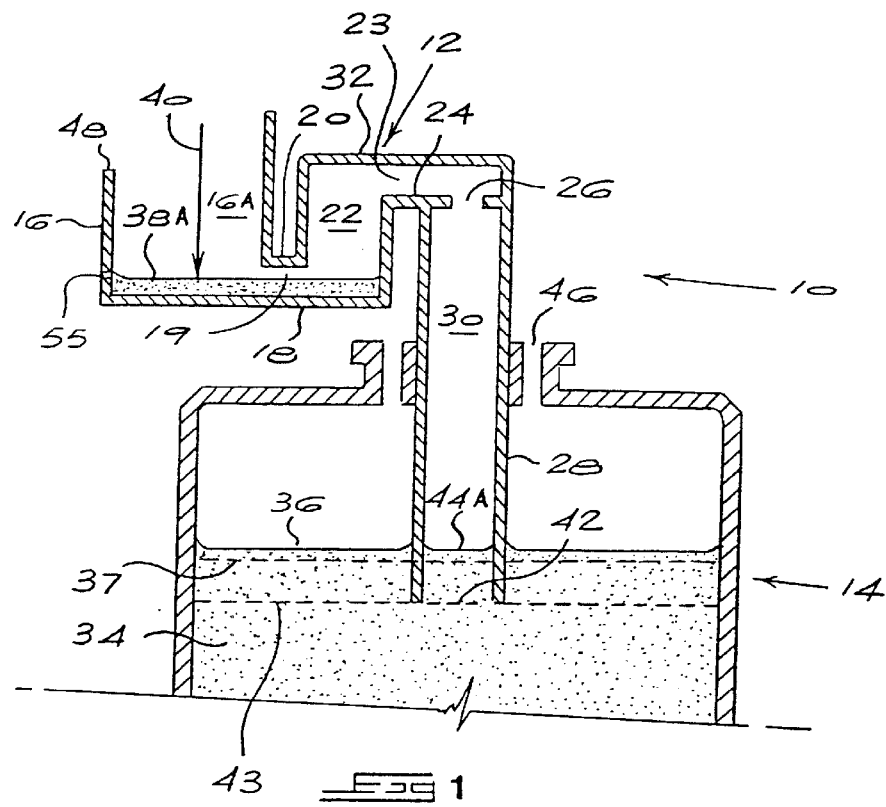
FIG. 1 shows a schematic cross-sectional view of a first embodiment of a filler unit of the invention in use on commencement of a filling operation, in which the quantity of liquid in the container is equal to, or higher than the desired level.

Referring first to FIG. 1, a filling arrangement 10 comprises a filler unit 12 disposed on a battery cell 14. The filler unit 12 includes an open topped vessel 16 with a bottom wall 18. A side wall arrangement having an opening 19 at the bottom forms a first divider 20, to partition the vessel into a vented portion 16A and an air entrapping portion in the form of a side chamber 22, yet also to allow a moderately restricted flow of liquid from the vessel 18 to the chamber 22 via the opening 19. A further side wall arrangement having an opening 23 at the top forms a second divider weir 24, imposing a significant restriction on the flow of liquid from the chamber 22 into a pressure-communicating duct 30 within a downpipe 28 via a restricted opening or orifice 26. The bottom wall 18 is common to the vessel 16 and the chamber 22, and a top wall 32 is common to the chamber 22 and the upper reaches of the pressure-communicating duct 30.

The container 14 is shown already holding a quantity of liquid 34 at a level 36 which is just higher than the desired level 37 of electrolyte in the battery cell. Nevertheless an operation is undertaken whereby the requisite steps are carried out to add liquid to the cell 14 by means of the filler unit 12.

Liquid may be applied to the vessel 16 by pouring or by means of a suitable conduit generally as indicated by the arrow 40. A quantity of liquid accumulates in the vessel 16, rising to a level 38A. The liquid 34 in the cell or container 14 remains at the level 36. The downpipe 28 has an open mouth 42 which is submerged in the liquid 34 at a predetermined level 43, and a portion of the liquid 34 has therefore entered the inner volume of the pressure communicating duct 30 within the downpipe 28, to a level 44A, which level is substantially the same as the level 36. Venting ducts 46 provide pressure equalization ensuring the pressure of air or gas within the cell in the vicinity of the downpipe 28 remains substantially the same as the pressure of air or gas in the vicinity of the vessel 16 which also vents to atmosphere.

Other than maintaining a rate of flow that is moderate, the flow of liquid 40 into the vessel 16 is not controlled, and provision is made to limit any rise above a predetermined, desired level within the vessel 16 by incorporation of a top overflow rim or weir 48 in a side wall of the vessel 16.

Figure 2:
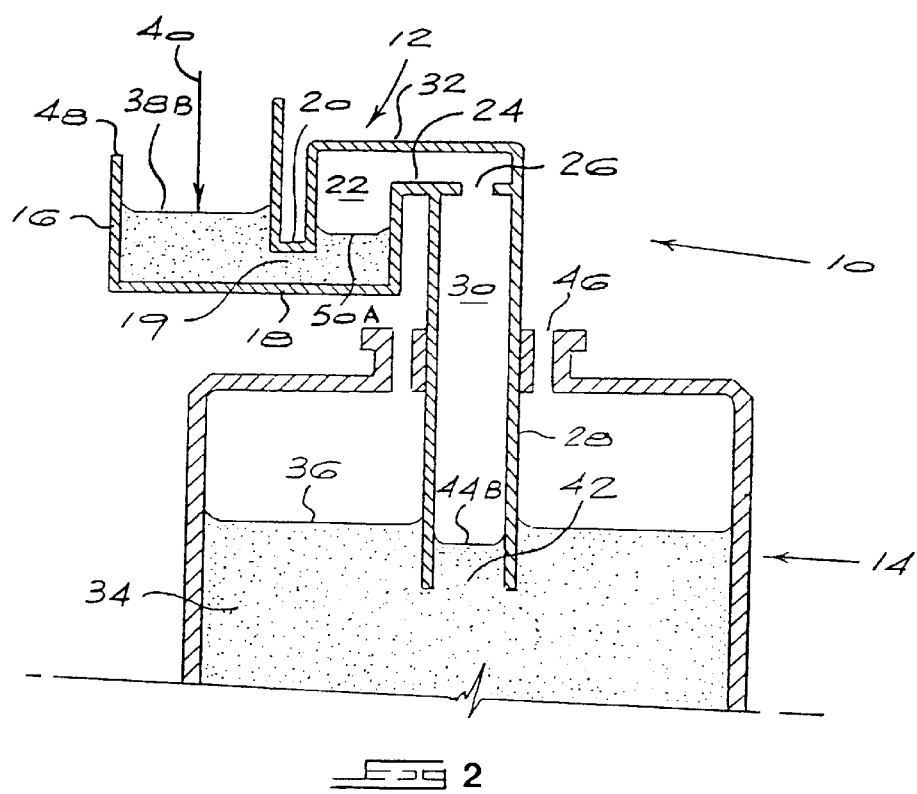
FIG. 2 shows the same unit of FIG. 1 during an intermediate stage of the operation.

In FIG. 2 the accumulating liquid in the vessel 16 has risen to a level 38B, submerging the opening 19 situated at the bottom of the first divider 20. Consequently, a quantity of liquid enters the chamber 22, rising to a level 50A. As the liquid rises inside the chamber 22 it displaces a volume of air or gas into the duct 30, causing the liquid inside the duct 30 at the submerged end of the downpipe 28 to be depressed to a level 44B.

Figure 3:
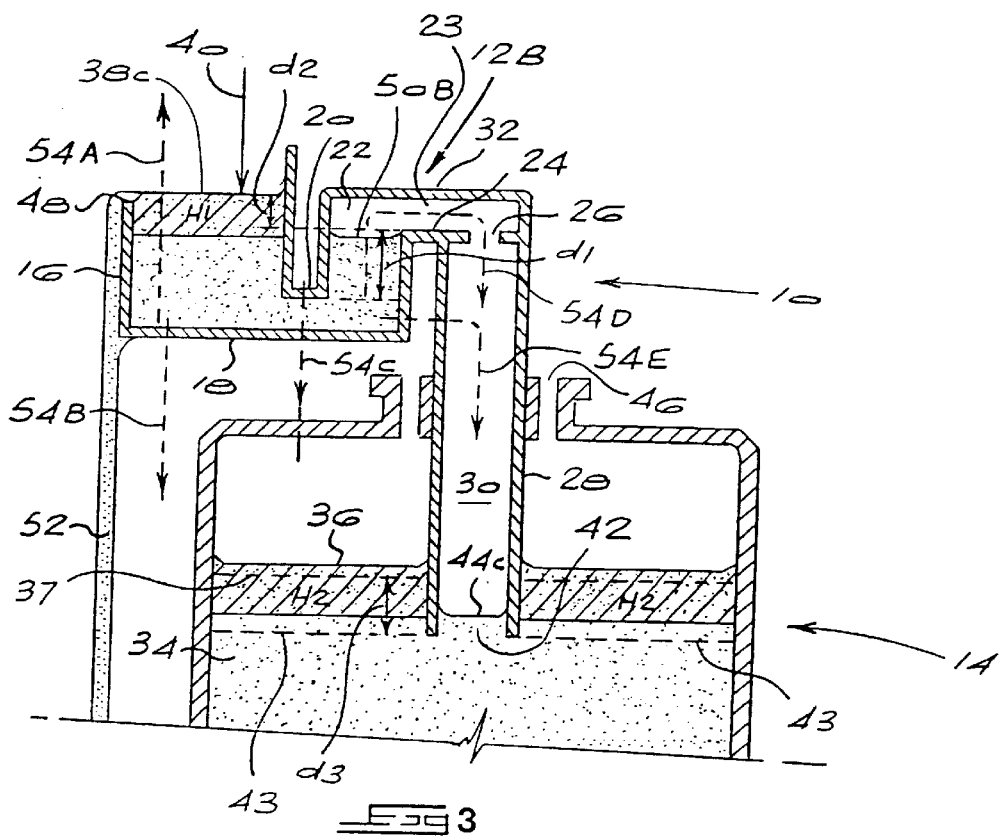
FIG. 3 shows the same unit of FIG. 1 on completion of the operation.

In FIG. 3 the accumulating liquid in the vessel 16 has risen to a predetermined, desired level 38C and excess liquid has started to flow over the overflow rim 48 and to form a disposal stream 62 outside the container. Simultaneously, the liquid entering the chamber 22 has risen to a level 50B, displacing a greater volume of air or gas into the duct 30 to create a pressurized air column or airtrap and causing the liquid inside the duct 30 at the submerged end of the downpipe 28 to be depressed further to a level 44C.

The depression of the liquid in the downpipe to the level 44C causes a corresponding marginal rise in the level of liquid 35 above the desired level 37. It will be appreciated, however, that the volume of liquid within the container remains unchanged, and that the levels 36 of FIGS. 1 and 3 are for practical purposes, the same.

It is evident that the pressurized air column within the duct 30 is established by application of sufficient liquid to the vessel 16, and that this pressure provides for the liquid inside the duct 30 at the submerged end of the downpipe 28 to be depressed to a level 44C. This pressure is exerted by a first predetermined liquid head Hi due to a level differential between the liquid level 38C in the vessel 16 and the liquid level SOB in the chamber 22. A condition of pressure equilibrium is reached in which a pressurized air column is established within the flow passage defined by the chamber 22, the opening 23, the aperture 26 and the duct 30. This pressurized air column effectively creates a second head of liquid H2 within the container. In the FIG. 3 condition, the pressure of air within the pressurized air column is sufficient to prevent the influx of water from the vessel to the container when the level 36 of liquid in the container is equal to or higher than the desired level 37.

This condition is achieved by virtue of a number of critical dimensions. First, the distance d1 between the bottom of the first divider 20 and the top of the second divider weir 24 needs to be sufficient to ensure that the water level 50B remains below the top of the divider weir 24. The first pressure head H1 needs to be sufficient to maintain the water level 50B just below the level of the divider weir 24 in the overflow condition illustrated in FIG. 3. This, inter alia, is dependent on the volume of water Hi creating the pressure head, which in turn is a function of the difference in height between the water levels 38C and 50B. This is ultimately determined by the difference d2 between the relative heights of the overflow rim 48 and the overflow weir 24.

Under the FIG. 3 conditions of static equilibrium, the second pressure head H2 also requires sufficient freeboard to be created. This is determined by the distance d3 between the predetermined level 43 of the mouth 42 of the downpipe and the desired level 37 of liquid. It is thus important that the distance d3 that the downpipe extends below the desired level 37 is sufficient to ensure that the pressure head H2 can be set up without the pressurized air column forcing the level 44C below the mouth 42 of the downpipe.

It may be convenient to utilize the disposal stream 52 for application to a second filler unit disposed on a second container. This may be repeated by utilizing the disposal stream of the second filler unit for application to a third filler unit, and so on. Liquid may be applied and utilized via suitable conduits such as tubing or piping, run conveniently to the filler units from a source, and extending between the filler units and, if necessary, also to a waste collector.

The filler unit as described, is intended for intermittent use on a container with significant rest periods between use. A typical application may cause any residual liquid in the vessel 16 to be dissipated by evaporation along the path indicated by the pointer 54A during these rest periods. The residual liquid may be lost during the rest periods from the vessel 16 through leakage to the surroundings along the path indicated by the pointer 54B. There may be leakage into the container 14 along the path indicated by the pointer 54C. There may also be seepage via the opening above the second divider weir 24 along the path indicated by the pointer 54D and via the jointing in the construction of the second divider 24 along the flowpath indicated by the pointer 54E, into the duct 30 and hence into the container 14. The volume of liquid contained in the vessel 16 is small, and the rate of loss generally low, therefore there is unlikely to be any material effect on the operation of the filler unit 12 or a material change in the quantity of liquid 34 in the container 14. Liquid may also be lost from the filler unit 12 when the unit is removed from the container 14 for inspection, and then replaced.

Significantly such loss of liquid from the vessel 16 as is likely to occur during the rest periods is highly advantageous to the operation of the filler unit 12. It is feasible to promote suitable loss by incorporation into the construction of the filler unit 12 of any suitable evacuating features which will ensure such loss—provided, of course, the loss is limited to an extent that is not detrimental to the proper functioning of the filler unit 12.

In some applications of the filler unit 12 there may be significant expansion and contraction of the body of liquid 34 in the container 14 during the rest periods due to a variety of causes such as electro-chemical activity or variations in temperature. Additional liquid may be introduced from another source, such as via the vent holes 46. The disadvantages which accrue from not facilitating a loss of liquid, as described, include a greatly increased susceptibility of the filler unit 12 malfunctioning in response to such variations.

By way of example, if the level 36 in the container 14 rises, and should continue to rise steadily subsequent to an operation of the filler unit 12, with residual liquid in the vessel 16 and the chamber 22, with reference to FIG. 3, there will be a corresponding increase in the level 44C (not shown) and a decrease in the level 50B. The increase in the level 36 can be sufficient to cause the level 50B to be decreased to below the level of the divider 20 with a consequent loss of air or gas from the chamber 22 into the vessel 16, from whence the air or gas rises to the surface of the liquid in the vessel 16 and will be lost from the filler unit 12.

The filler unit 12 may be engaged in an operation during and subsequent to this rise in the liquid level 36 with little or no difficulty. However, if the level 36 should rise and then come down to a level which is higher than or equal to the desired level, there will be a problem with the operation of the filler unit 12 in the absence of a mechanism which facilitates a loss or drainage from the vessel 16 to an extent which allows the air column or airtrap in the duct 30 to vent to atmosphere, and the first pressure head to be re-established on topping up of the vessel. This in turn re-pressurizes the air column in the duct 30 to prevent the inflow of liquid into the container.

Without such a drainage mechanism, there will be a loss of some air or gas from the chamber 22 whilst the liquid level 36 is rising, as described above. Then, as the liquid level 36 falls there will be a corresponding fall in the liquid level 44C (not shown) and an increase in the level 50B. The liquid in the chamber 22 will rise all the way to the opening 23 with consequent drawing in of additional liquid from the vessel 16 into the chamber 22. This may read to a partial vacuum in the duct 30, with the level of water 44A in the duct exceeding the water level 36 in the container. A quantity of liquid may be then drawn from the chamber 22 into the container 14 due to the resultant suction effect as the liquid level 36 is falling.

Operation of the filler unit 12 after this rise and fall, in the absence of a drainage mechanism, will result in a significant quantity of liquid proceeding into the container 14, and is likely to lead to overfilling of the container. Furthermore, if this cycle is repeated a sufficient number of times in succession it is possible that the liquid 34 in the container will rise sufficiently to overflow from the container 14.

It is therefore feasible to put the filler unit 12 to use with or without any liquid in the vessel 16 while the liquid 34 in the container 14 is at a level below the mouth 42 of the downpipe 28. It is not however advisable to operate the filler unit 12 with the level of the liquid 34 high enough to cause the mouth 42 of the downpipe 28 to be significantly submerged without ensuring adequate drainage of the liquid in the vessel 16 prior to commencement of operation of the filler unit 12, for the reasons described above. To this end, the aforementioned evacuating means are preferably provided. These may include a small aperture 55 in the vessel providing a stow leak, which is sufficient to evacuate the vessel to below the level of the first divider 20, thereby depressurizing the pressurized air column and allowing it to vent to atmosphere via the passage 19 is in cases where the liquid level in the container is, say, at the level 36 in FIG. 1. The aperture 55 may be provided at a point which is just below the lowermost level of the divider wall 20. The evacuating means may also be constituted by an opening in the vessel which vents to atmosphere, as was shown schematically at 54A. thereby allowing evacuation by evaporation.

A filler unit of this type is suitable for use in applications including the maintenance of levels in swimming pools, industrial engine sumps, electroplating cells and, in particular, on multi-celled batteries to provide single point battery watering Some aspects are typically changed to suit the application without materially affecting the filler units functionality.

Battery cells with a liquid electrolyte usually require periodic application of replenishment water to the electrolyte to make up for loss incurred through normal use of these cells. Replenishment water may he applied through a suitable conduit to convey the water from a source to the cells. The rate of flow and the replenishment levels in the cells are most conveniently controlled by means of filler units incorporating the advantageous functional features of the first embodiment.

Figure 4:
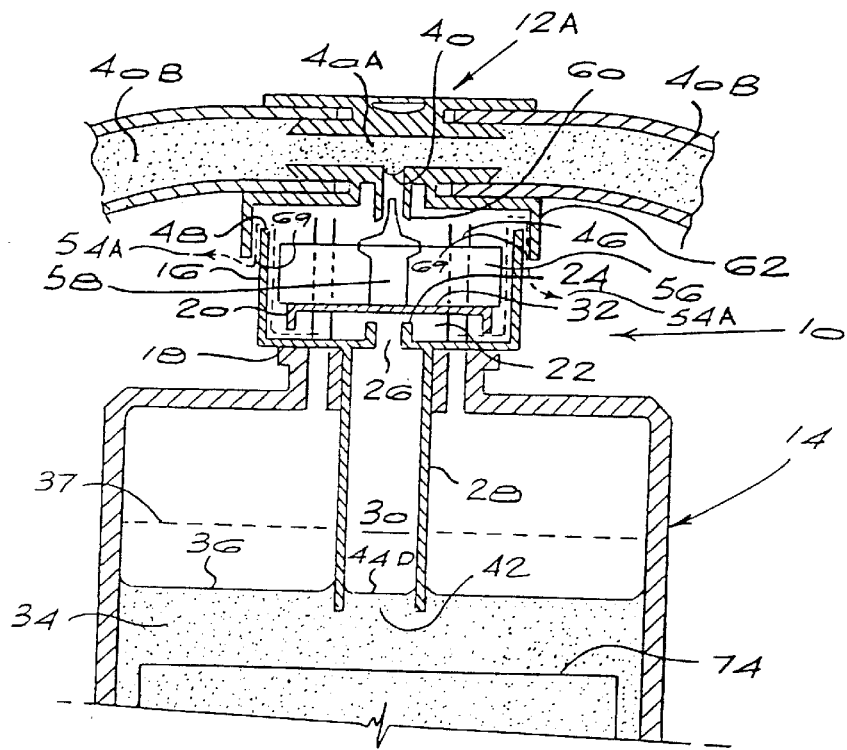
FIG. 4 shows a cross-sectional view of a second embodiment of a filler unit of the invention in use on commencement of an operation, in which the quantity of liquid in the container is below the desired level.

Therefore, in a typical battery filling configuration of FIG. 4, a filler unit 12A is positioned uppermost in a battery cell 14 containing a liquid electrolyte 34 to a level 36. The use of the overflow rim 48 in the first embodiment provides a simple means of establishing a substantially constant head of liquid in the vessel 16. An improved means of establishing a constant head includes a float 56 and a valve 58.

The supply conduit for the replenishment water is typically in the form of a system of tubes for conveying the water from a supply to a first filter unit and from the first filler unit to a second, and so on. FIG. 4 shows part of the conveying system including the filler unit 12A with an input tube and output tube arrangement 408 having an interposed teed through-duct 40A with an entry duct 40 to allow replenishment water to flow into the vessel 16. The entry duct 40 incorporates a valve seat 60 at its mouth. The valve 58 closely approaches the seat 60 when the float 56 is thrust upwardly by the liquid in the container 16, and is thereby able to maintain the inflow from the source into the vessel 16 equal to the outflow from the vessel 16 into the container 14 during a battery cell filling operation.

Those portions of the filler unit 12 as shown in FIGS. 1 to 3 comprising the first divider 20, the chamber 22, the second divider weir 24 and the top wall 32 may be reconfigured without materially affecting their functioning. FIG. 4 shows the resulting change in shape of these portions in a second embodiment where placement is facilitated in the base of the vessel 16 of the filler unit 12A. The restricted orifice 26 is generally circular in shape and has the divider 24 arranged concentrically about its perimeter. The top wall 32 is also generally circular in shape, having the divider 20 skirting its outer perimeter concentrically about the divider 24 and the orifice 26. In this embodiment the vessel 16 is also circular in shape and is concentrically disposed about the divider 20, the divider 24 and the orifice 26. Venting of the container volume is facilitated via the venting ducts 46 which traverse the vertical aspect of the vessel 16 without materially affecting the functioning of the filler unit 12A.

An overhead supporting cover 62 provides attachment for the supply conduit including through-duct 40A and entry duct 40. The cover 82 is attached by appropriate fastening means to the vessel 16 (not shown) while also allowing freedom for the overflow rim 48 to function as intended, and also to allow unimpeded air or gas displacement via the venting ducts 46 into and out of the container 14.

In FIG. 4, the supply of replenishment water has just been applied, and is shown having reached the entry duct 40. The vessel 16 is empty and the float 56 is therefore resting on an upper surface of the wall 38, with the valve 58 drawn away from the seat 60.

The battery cell 14 is shown already containing a quantity of electrolyte 34 at a level 36 which is sufficient to submerge the mouth 32 of the downpipe 28, but which is not higher than the desired level 37 of the electrolyte 34 in the battery cell 14. A portion of the electrolyte 34 has entered the inner volume of the pressure communicating duct 30 within the downpipe 28, to a level 44D, which level is substantially the same as the level 36 shown in FIG. 4, but which may differ from the level 36 shown in FIGS. 1, 2 and 3.

Figure 5:
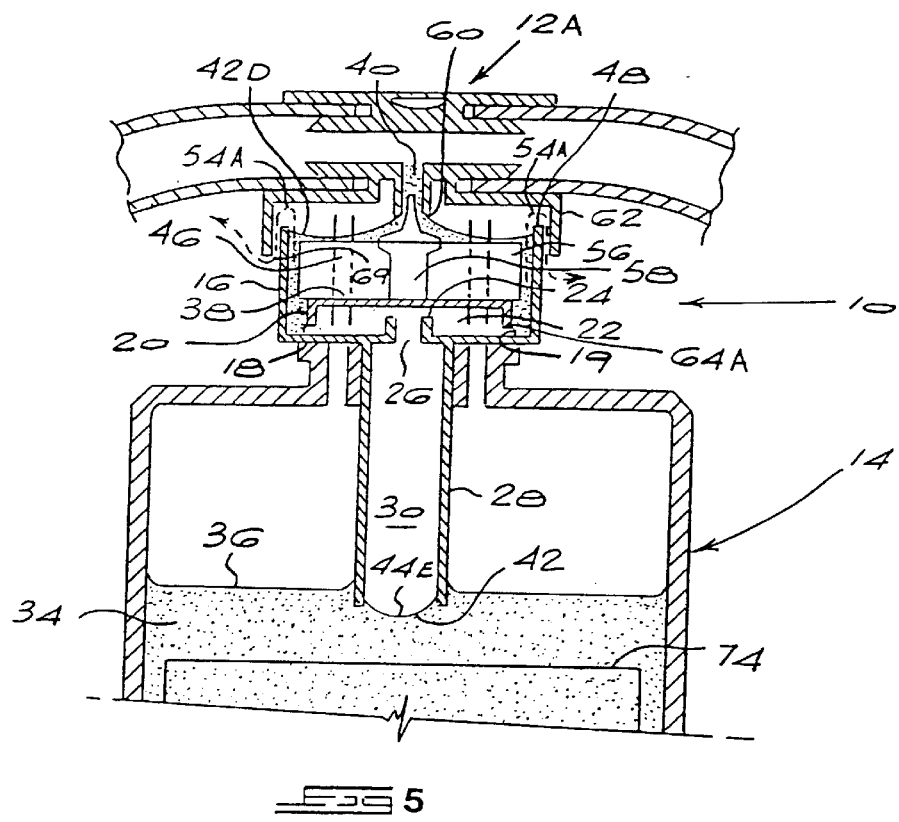
FIG. 5 shows the same unit of FIG. 4 at a first intermediate stage of the operation.

In FIG. 5 the replenishment water has filled the vessel 16 and has entered the opening 19 below the divider 20, providing a boundary 64A. The replenishment water entering the opening below the divider 20 commences a displacement of air or gas from within the chamber 22 into the duct 30, causing the level 44D to be depressed to a level 44E.

Figure 6:
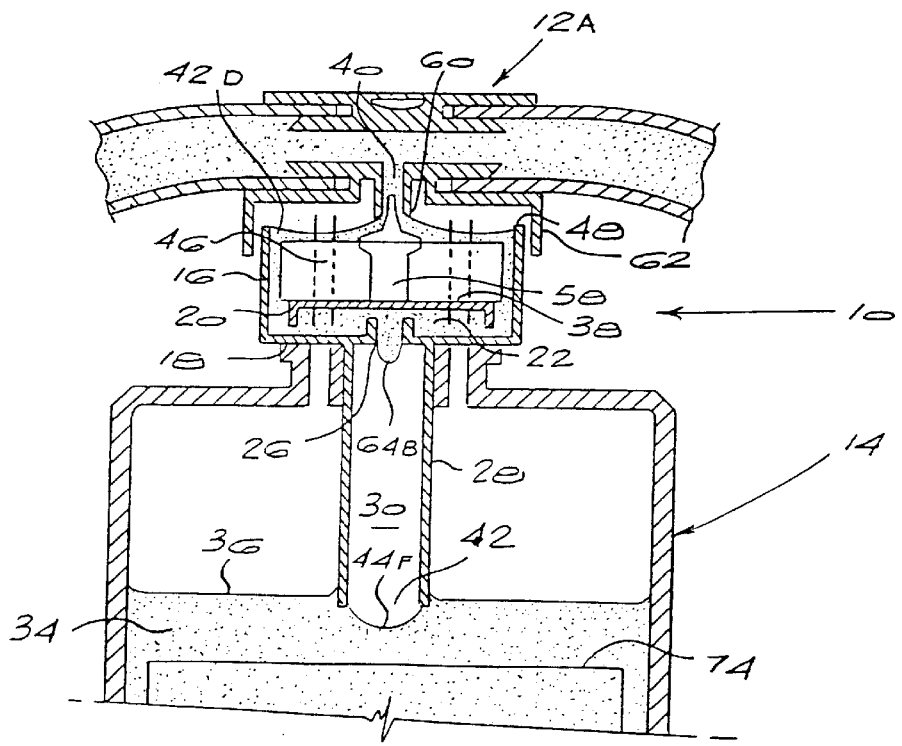
FIG. 6 shows the same unit of FIG. 4 at a second intermediate stage of the operation

In FIG. 6 the chamber 22 is totally filled and the replenishment water has passed over the opening above the divider 24 and via the orifice 26, and is shown at 64B about to commence flowing in to the battery cell 14 via the duct 30. A sufficient volume of air or gas has been displaced from the chamber 22 to cause the level 44E to be depressed to a level 44F which is below the mouth 32 of the downpipe 28.

Figure 7:
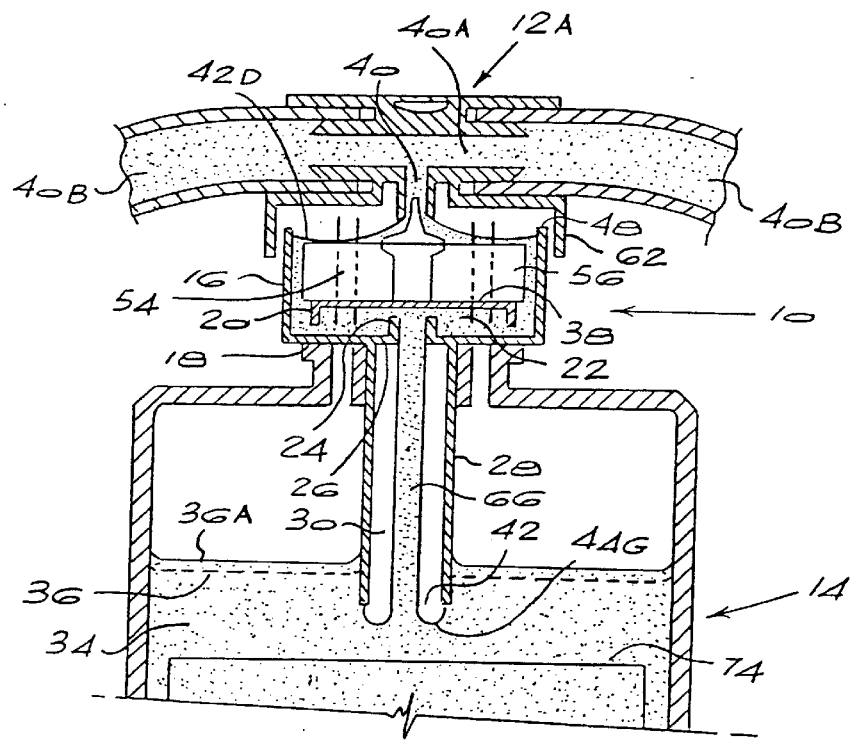
FIG. 7 shows the same unit of FIG. 4 at a third intermediate stage of operation.

In FIG. 7 a stream of water 86 is shown flowing into the battery call 14 via the duct 30, and causing the electrolyte 34 to rise from the level 36 to a level 36A, with the resultant increase in air pressure in the duct 30 depressing the level 44F to a level 44G, which is well below the mouth 32 of the downpipe 28.

Figure 8:
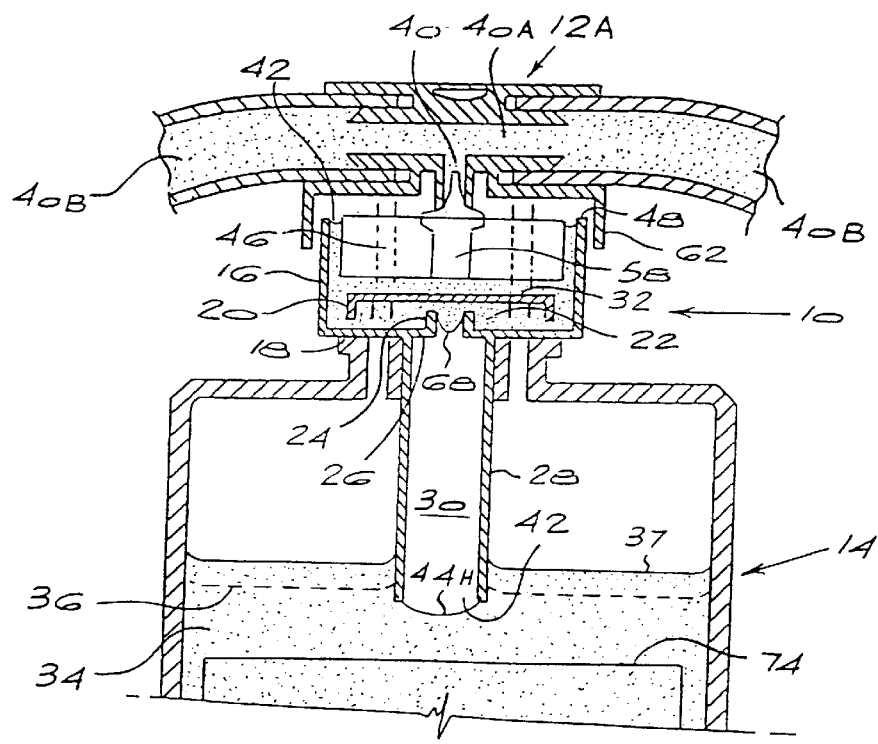
FIG. 8 shows the same unit of FIG. 4 on completion of the operation.

In FIG. 8 the stream of water 66 has stopped, and residual water already in the vessel 16 as well as in the chamber 22 is being held back at a boundary 68 in the vicinity of the orifice 26. The boundary 68 may lie near the top of the chamber 22. within the opening above the divider 24, within the orifice 26, or even slightly below the mouth of the orifice 26 depending on dimensional aspects and also on a variety of operational considerations of the battery cell.

Again, as was evident in the first embodiment, a pressurized column of air or gas within the duct 30 is established by application of water to the vessel 16, and this pressure provides for the electrolyte inside the duct 30 at the submerged end of the downpipe 28 to be depressed to a lower level 44H. A condition of pressure equilibrium is immediately attained when the electrolyte 34 is already equal to, or higher than the desired level, and therefore there will be no flow of water; but if the electrolyte 34 submerges the mouth 42 of the downpipe 28, yet is below the desired level 37, the requisite pressure can only be attained by the filler unit 12 admitting a limited quantity of water in to the sell 14, and by such admission developing requisite pressure in the chamber 30 as to achieve a pressure equilibrium. Admission of a suitably limited quantity of water as consequence of the operation of the filler unit 12 does not materially affect the level of the electrolyte in the battery cell 14.

The generally flattened and base-mounted configuration of the portion comprising the first divider 20, the chamber 22, the second divider 24 and the top wall 32 of the second embodiment provides an advantageous drainage arrangement from the vessel 16 into the battery call 14 which resembles the flow path indicated by the pointer 54D in FIG. 3. Drainage is typically assisted by movement of the battery well 14 or by arranging a reduction in the height differential between the lower edge of the first divider 20 and the upper edge of the second divider 24.

The filler unit 12A depicted in FIGS. 4 to 8 will generally retain the residual water in the vessel 16 and the chamber 22, as shown in FIG. 8, for a significant period of time subsequent to an operation. Then, as the battery cell undergoes normal electrical usage, this water will drain into the cell 14 or will evaporate via flowpaths indicated by arrows 54D extending through openings 69 venting to atmosphere defined between the weir 48 and the skirt of the cover 62, leaving the filler unit 12A primed for another operation.

FIG. 9 shows a third embodiment of the filler unit 12B on a battery cell 14 subsequent to completion of an operation. This third embodiment is similar to the second embodiment in most respects, except that the configuration of the portion comprising the first divider 20, the chamber 22, the second divider 24 and the top wall 32 is altered to place it within the pressure communicating duct to occupy the upper section of the downpipe 28.

In this embodiment the bottom wall 18 of the vessel 16 also serves as the top wall 32 of the displaced portion as described. The orifice 26 is annular and is situated between the wall of the first divider 20 and the opening 23 above the second divider 24. A duct is formed by the circular wall of the first divider 20 to form an inner tube 26A. The chamber 22 is formed between the circular wall of the first divider 20 and the circular wall of the second divider 24. The portion including the divider 20, the chamber 22, the divider 24 and the upper wall 32 is functionally substantially indistinguishable from the similarly identified portion of FIGS. 4 to 8. The tube 26A is a functional extension of the vessel 16.

The battery cell 14 is shown already containing a quantity of electrolyte 34 at a level 36 which is equal to, or higher than the desired level. A portion of the electrolyte 34 which had entered the inner volume of the pressure communicating duct 30 is shown depressed to a level 44l.

The battery cell contains positive and negative plates interspaced by separators which are arranged as elements 74 within the electrolyte 34. It is usual for gas bubbles 72 to form on the surface of the elements 74 especially toward the end of a charging phase of the battery cell 14. The bubbles grow on the elements 74 until they become sufficiently large to break loose, whereupon they rise upwardly in the electrolyte 34 as free bubbles 70. In time some of the free bubbles 70 rise upwardly from below the mouth 42 of the downpipe 26 into the duct 30, thereby progressively increasing the volume of air or gas in the duct 30. As consequence the pressure in the duct 30 rises, and the level 44l becomes depressed.

The filler unit 12 of the third embodiment is intended for intermittent use, and hence there will be significant rest period during which time the duct 30 will receive a significant amount of air or gas from the free bubbles 70 rising upwardly in the electrolyte 34. Indeed, it is likely there will be a surplus of air or gas received in this way, and this surplus will break away from the mouth 32 of the downpipe 28 from time to time and rise upwardly to the surface of the electrolyte 34.

The filler unit of the first and second embodiments can be similarly applied to a battery cell, and free bubbles 70 rising upwardly in the electrolyte 34 will be similarly received in the duct 30, with the self-same result and effect as an the filler unit 12 of the third embodiment.

It will be evident that if the water in the vessel 16 remains in place subsequent to an operation that the free bubbles 70 rising upwardly and received in the duct 30 during period of rest can cause a pressure in duct 30 sufficient to prevent a flow of water, provided the mouth 42 of the downpipe 28 remains significantly submerged in the electrolyte 34.

The degree of submersion of the mouth 42 required for the development of sufficient pressure may be assured by operating the filler unit 12 frequently, rather than infrequently. Retention of a sufficient quantity of water in the vessel 16 cannot be easily achieved since the mechanism responsive for loss through drainage and evaporation from the vessel 16 cannot be entirely suppressed. However, the battery cell itself provides a reliable source of replenishment liquid to maintain the vessel 16 filled to a workable level through evolution of electrolyte mist or spray which occurs towards the end of a charging phase of the battery cell 14.

A breaking by the free gas bubbles 70 on the surface of the electrolyte 34 provides sufficient agitation of the electrolyte 34 to produce an evolution of electrolyte mist or spray. A portion of this mist or spray passes via the venting ducts 46 into the interior of the filler unit 12, where a liquid portion attaches to the inner surfaces of the vessel 16, the cover 62 and the float 56. The attached liquid thereafter percolates to the base of the vessel 16 where the workable quantity of liquid accumulates in sufficient quantity to counteract the loss from the vessel 16. A portion of the accumulated liquid in the vessel 16 proceeds to the chamber 22 where it accumulates sufficiently to maintain a seal at the head of the pressure communicating duct 30, Upon operating the filler unit 12 shown in FIG. 9, a little water is likely to flow from the supply conduit into the vessel 16 via the entry duct 40 However, practically no water at all is likely to proceed in to the chamber 22 since it will already contain liquid to capacity. Therefore, the float 58 will rise upwardly almost immediately to close off the valve 58 against the seat 60.

The pressure of the air or gas within the duct 30 was already established by the accumulation of the free bubbles 70 in the duct 30 prior to the operation of the filler unit 12. Notwithstanding the adaptation of the passage, including the opening 19 below the divider 20, the chamber 22, the opening 23 above the divider 24, the opening or aperture 26 and the duct 30 as a flow passage, application of water to the vessel 16 does not provide a flow of liquid for the vessel 16 into the battery cell 14 when the electrolyte in the container 14 is equal to, or higher than the desired level 37. The tube 26A of the third embodiment does not materially affect the required flow characteristics of this flow passage.

In the filler unit 12 of FIG. 9, a series of spacer studs 76 extend from the bottom wall 18 of the vessel 16 So as to space the float 56 from the bottom wall when the float chamber is empty. In the event of liquid still being present within the chamber 22, this liquid is therefore provided with an evaporation path 54A via the tube 26A, the spacer stud-defined passage between the base of the float 56 and the bottom wall 18, an annular side passage between the side wall of the float and the side wall of the vessel 18, and an annular opening 69 venting to atmosphere.

An advantage of this versatile range of operational characteristics is that it engenders automatic compensation for the variety of condition prevailing in the application of these filler units of the invention.

The invention extends to the use of filler units having multiple pressure communicating ducts or other level sensing arrangements and filler units adapted to be used in conjunction with multiple celled batteries having unitary means for establishing a constant head of liquid.

I claim:

1. A filler unit for dispensing a liquid into a container to top up the container to a predetermined desired level, the unit including a vessel for containing the liquid to be dispensed, means for establishing a first predetermined substantially constant head of liquid in the vessel, means defining at least one flow passage communicating between the vessel and the container, the flow passage defining means including a downpipe extending downwardly into the container, means for establishing a second head of liquid within the container responsive to the first head, the first and second head establishing means being arranged to co-operate to form therebetween a pressurized air column in the downpipe which is sufficient to prevent an inflow of liquid from the vessel to the container in response to filling of the vessel whilst a pre-existing level of liquid in the container is equal to or higher than the predetermined desired level, and evacuating means comprising a liquid evacuating passage along which liquid can leave the vessel thereby to reduce the level of the first predetermined substantially constant head of liquid to a venting level at which the pressurized air column is vented to allow the pressurized air column to re-establish itself on topping up of the vessel, so as to prevent overtopping of the container.

2. A filler unit according to claim 1 in which the means for establishing the first predetermined head of liquid includes divider means for dividing the vessel into a first vented portion in which the liquid is permitted to reach a predetermined maximum head-defining level and a second air entrapping portion arranged to entrap the pressurized air column.

3. A filler unit according to claim 2 in which the evacuating means is arranged to evacuate the vessel prior to a subsequent topping up operation to the venting level at which the pressurized air column is depressurized by venting it to atmosphere via the first vented portion.

4. A filler unit according to claim 3 in which the evacuating means is arranged to allow the first predetermined substantially constant level of liquid in the vented portion of the vessel to fall below a lower level of the divider means between topping up operations so that the second air entrapping portion is vented to atmosphere and the pressurized air column is depressurized.

5. A filler unit according to claim 3 in which the evacuating means comprises at least one aperture defined in a side or base wall of the vessel below a lower level of the divider means.

6. A filler unit according to claim 3 in which the evacuating means comprises at least one opening via which the vessel vents to atmosphere, so as to allow evaporation of the liquid in the vessel between topping up operations.

7. A filler unit according to claim 2 in which the predetermined maximum head-defining level is defined by an overflow rim or weir which is arranged to permit an overflow to follow a flowpath outside the container.

8. A filler unit according to claim 2 in which the second air entrapping portion is defined by the divider means and includes a first divider which extends downwardly to a first predetermined level within the vessel, and a second divider weir which extends upwardly to a second predetermined level above the first level and which divides the vessel from the downpipe, the difference in height between the first and second levels being sufficient to allow the second head of liquid to act and to entrap the pressurized column of air.

9. A filler unit according to claim 8 in which a restricted orifice is located at the head of the downpipe downstream of the entrapping portion, the restricted orifice being arranged to supplement the action of the first and second liquid head establishing means in defining an upper boundary of the pressurized air column at which a condition of pressure equilibrium is attained to cause a flow from the vessel to the container to cease automatically.

10. A filler unit according to claim 1 in which the means for establishing the second predetermined head of liquid includes the downpipe terminating in a mouth portion which extends to a predetermined level a predetermined distance below the predetermined desired level, the predetermined distance being sufficient to establish the second head of liquid.

11. A filler unit according to claim 1 in which the means for establishing the first predetermined substantially constant head of liquid in the vessel includes a float chamber having an uppermost inlet conduit and carrying a float valve arranged to shut off the inlet conduit in the event of the liquid in the float chamber reaching a predetermined level.

12. A filler unit according to claim 1 which is a battery watering unit, in which the container is a battery cell, and in which the downpipe is arranged to extend through a replenishment aperture in the battery cell, so that the battery watering unit is mounted atop the cell.

13. A battery watering unit for dispensing electrolyte into a battery cell to top up the battery cell to a predetermined desired level, the unit including a vessel for containing the electrolyte to be dispensed, means for establishing a first predetermined substantially constant head of electrolyte, means defining at least one flow passage communicating between the vessel and the cell, the flow passage defining means including a downpipe extending downwardly into a replenishment aperture in the cell, means for establishing a second head of electrolyte within the cell responsive to the first head, the first and second head establishing means being arranged to co-operate to form therebetween a pressurized air column in the downpipe which is sufficient to prevent an inflow of electrolyte from the vessel to the battery cell in response to filling of the vessel whilst a pre-existing level of electrolyte in the battery cell is equal to or higher than the predetermined desired level, and evacuating means comprising a liquid evacuating passage along which liquid can leave the vessel thereby to reduce the level of the first head of electrolyte to a venting level at which the pressurized air column is vented to allow the pressurized air column to re-establish itself on topping up of the vessel, so as to prevent overtopping of the battery cell.

* * * * *

UNITED STATES PATENT AND TRADEMARK OFFICE
CERTIFICATE OF CORRECTION

PATENT NO.      : 6,446,681 B1                                                Page 1 of 1
DATED           : September 10, 2002
INVENTOR(S)     : Fitter It is certified that error appears in the above-identified patent and that said Letters Patent is hereby corrected as shown below:

<u>Title page,</u>
Item [57], ABSTRACT,
Line 18, "fanned" should read -- formed --.

Signed and Sealed this

Fourth Day of February, 2003

JAMES E. ROGAN
*Director of the United States Patent and Trademark Office*